US009866860B2

(12) United States Patent
Lewis

(10) Patent No.: US 9,866,860 B2
(45) Date of Patent: *Jan. 9, 2018

(54) METHOD AND SYSTEM TO COMBINE MULTIPLE ENCODED VIDEOS INTO AN OUTPUT DATA STREAM OF ENCODED OUTPUT FRAMES

(71) Applicant: Google Inc., Mountain View, CA (US)

(72) Inventor: Andrew Benedict Lewis, London (GB)

(73) Assignee: Google LLC, Mountain View, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/682,864

(22) Filed: Apr. 9, 2015

(65) Prior Publication Data

US 2015/0319452 A1    Nov. 5, 2015

Related U.S. Application Data

(63) Continuation of application No. 14/267,486, filed on May 1, 2014, now Pat. No. 9,031,138.

(51) Int. Cl.
*H04N 7/12*       (2006.01)
*H04N 19/51*    (2014.01)
(Continued)

(52) U.S. Cl.
CPC ............ *H04N 19/51* (2014.11); *G11B 27/02* (2013.01); *H04N 7/0806* (2013.01);
(Continued)

(58) Field of Classification Search
CPC ...... G11B 27/02; H04N 19/119; H04N 19/12; H04N 19/136; H04N 19/174; H04N 19/27;
(Continued)

(56) References Cited

U.S. PATENT DOCUMENTS 5,691,768 A * 11/1997 Civanlar ................... G06T 3/40
375/240.01
6,441,841 B1    8/2002 Tanoi
(Continued)

OTHER PUBLICATIONS

Office Action for U.S. Appl. No. 14/267,486 dated Sep. 10, 2014, 19 pages.
(Continued)

*Primary Examiner* — Jessica M Prince
(74) *Attorney, Agent, or Firm* — McDonnell Boehnen Hulbert & Berghoff LLP

(57) ABSTRACT

Methods and systems described herein provide for combining multiple data streams representing respective videos into an output data stream. An example implementation may involve receiving a first data stream that represent a first video and a second data stream that represent a second video. The first data stream and the second data stream may include a first sequence of frames that includes first intra-coded frames and a second sequence of frames that includes second intra-coded frames, respectively. The example implementation may further involve combining the received first data stream and the received second data stream to obtain an output data stream of encoded output frames such that an encoded output frame includes a respective frame of the first sequence and a respective frame of the second sequence and that first intra-coded frames are combined with respective second intra-coded frames in respective encoded output frames within the output stream.

17 Claims, 10 Drawing Sheets

(51) Int. Cl.
*H04N 19/44* (2014.01)
*H04N 19/593* (2014.01)
*H04N 19/136* (2014.01)
*H04N 19/174* (2014.01)
*H04N 19/42* (2014.01)
*H04N 19/12* (2014.01)
*H04N 19/436* (2014.01)
*G11B 27/02* (2006.01)
*H04N 21/234* (2011.01)
*H04N 21/2365* (2011.01)
*H04N 19/70* (2014.01)
*H04N 7/08* (2006.01)
*H04N 19/23* (2014.01)
*H04N 19/119* (2014.01)
*H04N 19/27* (2014.01)
*H04N 7/15* (2006.01)

(52) U.S. Cl.
CPC .......... *H04N 19/12* (2014.11); *H04N 19/136* (2014.11); *H04N 19/174* (2014.11); *H04N 19/23* (2014.11); *H04N 19/42* (2014.11); *H04N 19/436* (2014.11); *H04N 19/44* (2014.11); *H04N 19/593* (2014.11); *H04N 19/70* (2014.11); *H04N 21/234* (2013.01); *H04N 21/2365* (2013.01); *H04N 21/23424* (2013.01); *H04N 7/15* (2013.01); *H04N 7/152* (2013.01); *H04N 19/119* (2014.11); *H04N 19/27* (2014.11)

(58) Field of Classification Search
CPC ...... H04N 19/42; H04N 19/436; H04N 19/44; H04N 19/51; H04N 19/593; H04N 19/70; H04N 21/234; H04N 21/23424; H04N 21/23
See application file for complete search history.

(56) References Cited

U.S. PATENT DOCUMENTS

| | | | |
|---|---|---|---|
| 8,374,249 | B2 | 2/2013 | Suh et al. |
| 8,538,197 | B2 | 9/2013 | Kobayashi et al. |
| 2003/0123537 | A1 | 7/2003 | Yona et al. |
| 2004/0022202 | A1 | 2/2004 | Yang et al. |
| 2005/0036550 | A1 | 2/2005 | Koba et al. |
| 2009/0067507 | A1* | 3/2009 | Baird .................... H04N 7/152 375/240.24 |
| 2009/0300676 | A1 | 12/2009 | Harter, Jr. |
| 2011/0058607 | A1 | 3/2011 | Zhao |
| 2011/0286530 | A1 | 11/2011 | Tian et al. |
| 2012/0027085 | A1 | 2/2012 | Amon et al. |
| 2013/0022104 | A1 | 1/2013 | Chen et al. |
| 2014/0092954 | A1* | 4/2014 | Soukup ............. H04N 21/2365 375/240.01 |
| 2014/0108605 | A1* | 4/2014 | Wang ................... H04L 65/602 709/217 |

OTHER PUBLICATIONS

Final Office Action for U.S. Appl. No. 14/267,486 dated Dec. 1, 2014, 21 pages.
Notice of Allowance for U.S. Appl. No. 14/267,486 dated Mar. 2, 2015, 8 pages.
Shaw-Min Lei et al., "Video Bridging based on H.261 Standard", IEEE Transactions on Circuits and Systems for Video Technology, IEEE Service Center, vol. 4, No. 4, Aug. 1, 1994, pp. 425-536.
International Preliminary Report on Patentability prepared by WIPO in International Patent Application Serial No. PCT/US2015/028036, dated Nov. 1, 2016.

* cited by examiner

FIG. 7

Frame 700 divided into Slice 702, Slice 704, Slice 706, Slice 708, with cells numbered 0–63 in column-major order.

METHOD AND SYSTEM TO COMBINE MULTIPLE ENCODED VIDEOS INTO AN OUTPUT DATA STREAM OF ENCODED OUTPUT FRAMES

CROSS-REFERENCE TO RELATED APPLICATIONS

This application is a continuation of U.S. patent application Ser. No. 14/267,486, filed on May 1, 2014, entitled "Method and System to Combine Multiple Encoded Videos For Decoding Via A Video Decoder," which is incorporated herein by reference in its entirety.

BACKGROUND

Unless otherwise indicated herein, the materials described in this section are not prior art to the claims in this application and are not admitted to be prior art by inclusion in this section.

Media, such as video and audio, is often compressed to reduce the quantity of data needed to represent the media (commonly known as the bit rate). By reducing the bit rate, a smaller amount of data storage may be needed to store the video and less bandwidth may be needed to transmit the video over a network. Numerous video codecs (coder/decoders) exist as hardware and/or software components that enable compression or decompression of digital video. To decode compressed video, many types of computing devices have hardware and/or software decoding units.

Decoding video can be a CPU-intensive task, especially for higher resolutions like 1080p. Therefore, while video decoders may be implemented as software modules that execute on general purpose processors, in many circumstances, specialized hardware decoders may be more efficient and/or more capable, especially with regards to decoding higher-resolution video. Some low-power devices, such mobile computing devices, may be equipped with general purpose processors that may have difficulty decoding high-resolution video in real-time and/or within an acceptable power envelope. To assist in decoding such videos, some mobile computing devices, such as smartphones and tablets, may be equipped with one or more hardware video decoders configured to decode compressed video.

BRIEF SUMMARY

In one example, a method is provided that includes receiving, by a processor, a first data stream that represents encoded frames of a first video and receiving a second data stream that represents encoded frames of a second video. For each frame of the received first data stream, the method further includes defining in a header of the frame that the frame is a first slice of a respective output frame. And, for each frame of the received second data stream, the method includes defining in a header of the frame that the frame is a second slice of the respective output frame and that the second slice is stacked vertically underneath the first slice in the respective output frame. The method then includes generating an output data stream that is configured to represent the encoded frames of the first video as respective first slices of encoded output frames and to represent the encoded frames of the second video as respective second slices of the encoded output frames such that a respective output frame is divided into a respective first slice and a respective second slice. The method also includes sending the generated output data stream to a decoder.

In another example, a computer readable storage memory is provided that has stored therein instructions, that when executed by a processor, cause the processor to perform functions. The functions comprise receiving a first data stream that represents encoded frames of a first video and receiving one or more additional data streams that each represent encoded frames of a respective video. For each encoded frame of the received first data stream, the functions also comprise combining a respective frame of each of the one or more additional data streams with the encoded first frame such that each encoded first frame includes a respective frame of the first video and a respective frame of each of the one or more additional data streams. The functions further comprise decoding, by a particular decoder, each combined frame of the first data stream into an output surface format that represents the frames of the first video and the frames of each of the videos of the one or more additional data streams. The functions also comprise providing for concurrent display the decoded frames of the first video and the decoded frames of each of the videos of the one or more additional data streams.

In still another example, a device is provided that comprises one or more processors and data storage configured to store instructions, that when executed by the one or more processors, cause the device to perform functions. The functions comprise receiving a first data stream that represents encoded frames of a first video, where each encoded frame of the first video is divided into a respective first macroblock array, and receiving a second data stream that represents encoded frames of a second video, where each encoded frame of the second video is divided into a respective second macroblock array. The functions also comprise combining the received first data stream and the received second data stream into an output data stream that is configured to represent encoded output frames. Each encoded output frame includes the second macroblock array of a respective encoded frame of the second video vertically concatenated to the first macroblock array of a respective encoded frame of the first video. The functions further comprise decoding the output data stream into an output surface format that includes, in respective non-overlapping regions, decoded frames of the first video and decoded frames of the second video and providing the decoded frames of the first video and the decoded frames of the second video for display.

In yet another example, a system is provided that includes a means for receiving a first data stream that represents encoded frames of a first video and a means for receiving one or more additional data streams that each represent encoded frames of a respective video. For each encoded frame of the received first data stream, the system further includes a means for combining a respective frame of each of the one or more additional data streams with the encoded frame of the first video such that each encoded frame includes a respective frame of the first video and a respective frame of each of the one or more additional data streams. The system further includes a means for decoding, by a particular decoder, each combined frame of the first data stream into an output surface format that represents the frames of the first video and the frames of each of the videos of the one or more additional data streams. The system further includes a means for providing for display the decoded frames of the first video and the decoded frames of each of the videos of the one or more additional data streams.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 7 illustrates an example frame of another combined video data stream.

DETAILED DESCRIPTION

Figure 1:
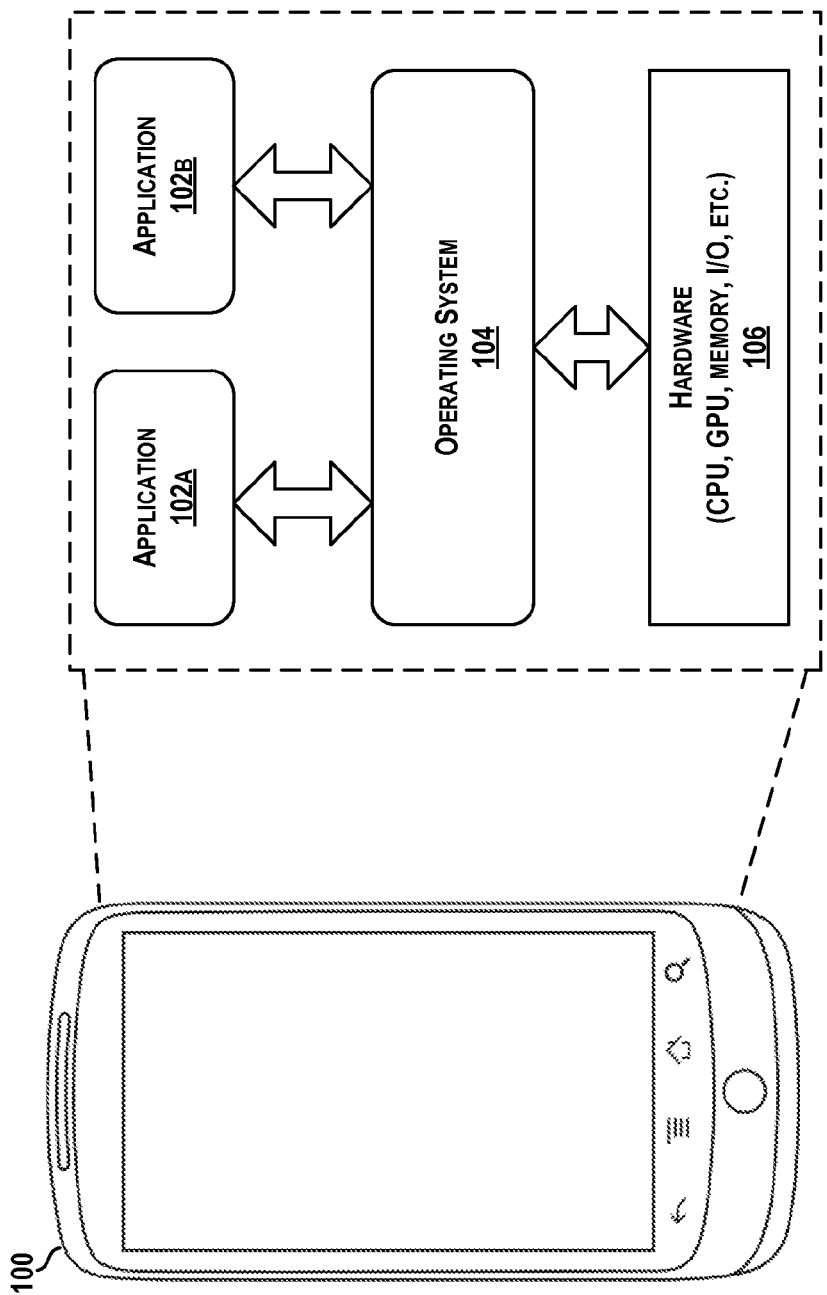
FIG. 1 illustrates an example computing device by which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A given computing device may have a video decoder that assists the computing device in decoding encoded videos. In some cases, the video decoder may be implemented within the computing device as specialized hardware configured to execute specific code algorithms which function to decode video. The specialized hardware may support decoding a certain number of video streams concurrently. For instance, the specialized hardware may include a total of two hardware decoder units, each of which may support decoding one video at a time.

At the same time, some applications may provide for displaying more videos concurrently than the specialized hardware can decode concurrently. For example, a video chat application that supports group chat with multiple computing devices concurrently may provide for concurrent display a video stream from each computing device. As another example, a news feed application may provide for display of a preview video next to each news item in a news feed of multiple news items. When an application provides for the concurrent display of more video streams than a given computing device supports in hardware, the computing device may decode one or more of the video streams using a software decoder. However, decoding in software on a general purpose processor is not typically as efficient as decoding on a hardware decoder. In some cases, the general purpose processor on which the software decoder is executing may not be fast enough to decode the one or more video streams in real-time. Also, in some cases, decoding in software may significantly increase the processor utilization, which may negatively affect the user experience in various ways, such as by causing the UI to feel sluggish or unresponsive. In some cases, decoding a video in software may also use relatively more battery charge than used by decoding the video using specialized hardware. As an alternative to decoding with a software decoder, manufacturers may include additional decoding units in their computing devices. However, this solution may increase the cost and power consumption of the computing devices.

Within examples, methods and systems are provided for decoding, via a single video decoder, multiple compressed video sources for concurrent display. For example, a processor may receive two or more data streams that each represent an encoded video. The processor may then combine the two or more data streams into an output data stream that represents frames having content from each of the two or more data streams. The processor may then provide the output data stream as input to a video decoder, which may provide decoded frames that include content from each of the two or more video streams. The processor may then divide the outputted frames into their component videos.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

Referring now to the figures, FIG. 1 illustrates an example computing device 100 by which an example method may be implemented. Computing device 100 may include applications 102a and 102b and an operating system 104 being executed by hardware 106. Although the example computing device 100 is a smartphone, aspects of this disclosure are applicable to other computing devices such as PCs, laptops, tablet computers, etc.

Each of the applications 102a and 102b may include instructions that when executed cause the computing device 100 to perform specific tasks or functions. Applications 102a and 102b may be native applications (i.e., installed by a manufacturer of the computing device 100 and/or a manufacturer of the operating system 104) or may be a third-party application installed by a user of the computing device 100 after purchasing the computing device. A non-exhaustive list of example applications includes: a media player application that accepts media files as inputs and generates corresponding video and/or audio to the output device(s); a video gallery application; a video communication application (e.g. a video chat or video call application); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 104 may interact with and manage hardware 106 to provide services for the applications 102*a* and 102*b*. For example, an application 102*a* may request that the operating system 104 direct an integrated camera of hardware 106 to capture a visual image and that the hardware 106 store the image to memory.

The hardware 106 may include, for example, a central processing unit (CPU), a graphics processor (GPU), memory, an input/output (I/O) interface, user input device(s), and output device(s). Components of hardware 106 may be controlled by instructions contained in applications 102*a* and 102*b* and operating system 104.

The central processing unit (CPU) may be operable to effectuate the operation of the computing device 100 by executing instructions stored in memory or disk storage. Such instructions may include the operating system 104 and the applications 102*a* and 102*b*. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate the operation of the operating system 104 and the applications 102*a* and 102*b*. Runtime memory may store data generated or used during execution of the operating system 104 or applications 102*a* and 102*b*.

The input/output (I/O) interface may be operable to receive signals from the input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing device 100.

The output devices may include, for example, a screen and speakers. The screen may be, for example, a liquid crystal display (LCD) screen, an OLED screen, an e-ink screen, and/or any other suitable device for presenting a graphical user interface.

Figure 2:
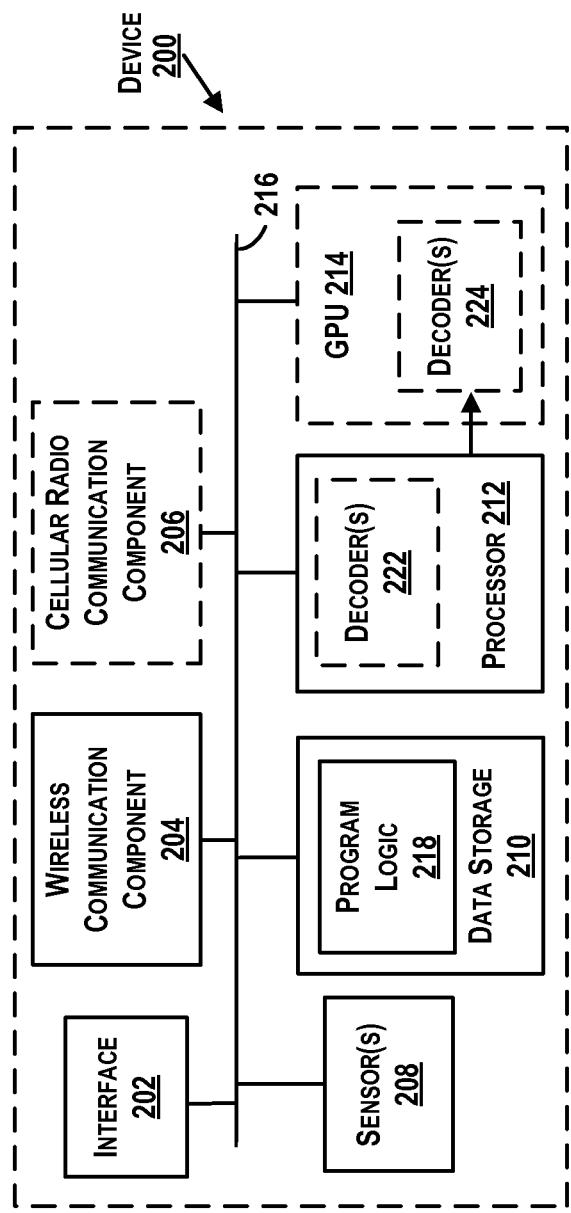
FIG. 2 illustrates example components of an example computing device.

FIG. 2 illustrates example components of an example computing device, such as the example computing device 100 in FIG. 1, among other examples. In some examples, some components illustrated in FIG. 2 may be distributed across multiple computing devices. However, for the sake of example, the components are shown and described as part of one example device 200. The device 200 may be or include a mobile device, desktop computer, laptop computer, email/messaging device, tablet computer, or similar device that may be configured to perform the functions described herein.

In some implementations, the device 200 may include a device platform (not shown), which may be configured as a multi-layered Linux platform. The device platform may include different applications and an application framework, as well as various kernels, libraries, and runtime entities. In other examples, other formats or systems may operate the device 200 as well.

The device 200 may include an interface 202, a wireless communication component 204, a cellular radio communication component 206, sensor(s) 208, data storage 210, and a processor 212. Components illustrated in FIG. 2 may be linked together by a communication link 216. The device 200 may also include hardware to enable communication within the device 200 and between the device 200 and another computing device (not shown), such as a server entity. The hardware may include transmitters, receivers, and antennas, for example.

The interface 202 may be configured to allow the device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the device 200. In other examples, records of data may be maintained and managed by other components of the device 200. The interface 202 may also include a receiver and transmitter to receive and send data. In other examples, the interface 202 may also include a user-interface, such as a keyboard, microphone, touch-screen, etc., to receive inputs as well.

The wireless communication component 204 may be a communication interface that is configured to facilitate wireless data communication for the device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The cellular radio component 206 may be a communication interface that is configured to facilitate wireless data communication according to one or one cellular radio standards. For example, the cellular radio component 206 may include a cellular radio that is configured to facilitate wireless data communication according to one or more cellular standards, such as the Global System for Mobile Communications (GSM), Code Division Multiple Access, Long-Term Evolution (LTE), Worldwide Interoperability for Microwave Access (WiMax), among others.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 212. The data storage 210 may also store data 220 that may include data received by any of the wireless communication component 204, the cellular radio communication component 206, the GPS 208, and any of sensors 210. For instance, the data storage 212 may store one or more data streams that represent video.

The processor 212 may be a general purpose processor that may access program logic 218 that can be retrieved and executed by the processor 212. The processor may include one or more decoder(s) 222 that may be configured to decode encoded video. A non-exhaustive list of example video codecs that may be processed by the one or more decoder(s) 222 include MPEG (e.g. H.264/MPEG-4 AVC and H.265/MPEG-H HEVC), Windows Media Video (WMV), On2 (e.g. VP8 and VP9), Sorenson, Dirac, Cinepak, and RealVideo.

The device 200 is illustrated to include a graphics processing unit (GPU) 214. The GPU 214 may be configured to control other aspects of the device 200 including displays or outputs of the device 200. The GPU 214 may include one or more decoder(s) 224 that may be configured to decode video that has been compressed using one or more of the above-referenced video codecs, among other examples.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

Example methods described herein may be performed individually by components of the device 200, or in combination by one or all of the components of the device 200. In one instance, portions of the device 200 may process data and provide an output internally in the device 200 to the processor 212, for example. In other instances, portions of the device 200 may process data and provide outputs externally to other computing devices.

Figure 3:
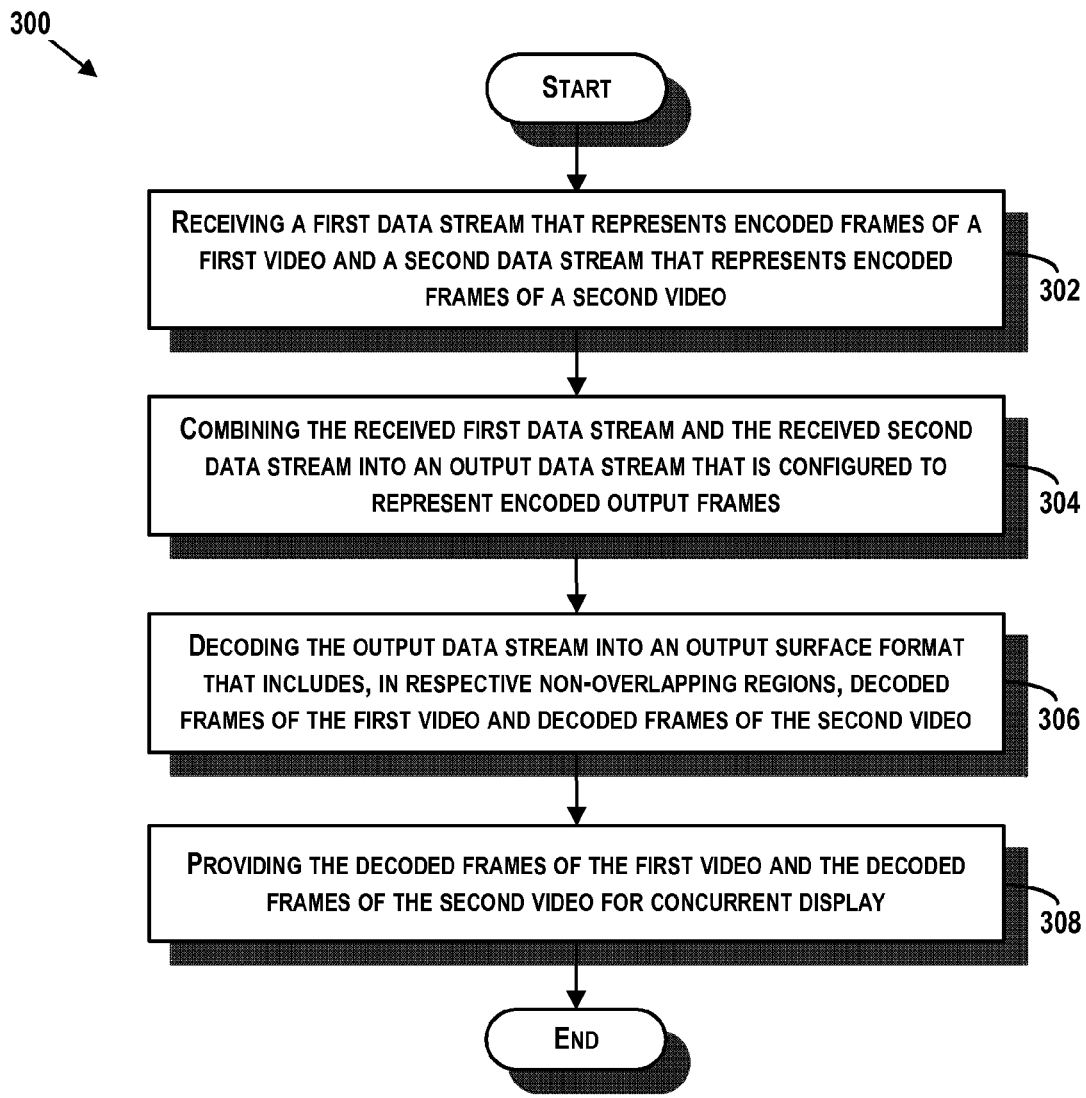
FIG. 3 is a flowchart illustrating an example method for combining multiple encoded video streams for concurrent decoding.

FIG. 3 is a block diagram of an example method 300 to provide for decoding multiple compressed video sources via a video decoder for simultaneous display, in accordance with at least some embodiments described herein. Method 300 shown in FIG. 3 presents an embodiment of a method that, for example, could be used with a computing device, such as computing device 100 in FIG. 1 or device 200 in FIG. 2, among other examples. Method 300 may include one or more operations, functions, or actions as illustrated by one or more blocks of 302-308. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 300 and other processes and methods disclosed herein, each block in FIG. 3 may represent circuitry that is wired to perform the specific logical functions in the process.

Functions of the method 300 may be fully performed by a processor of a computing device, or may be distributed across multiple components of a computing device. In some examples, the functions of method 300 may be distributed across multiple computing devices and/or a server.

At block 302, the method 300 involves receiving a first data stream that represents encoded frames of a first video and receiving a second data stream that represents encoded frames of a second video. While the functions of receiving the first data stream and receiving the second data stream are discussed herein as one function, they may be implemented as separate functions which may be performed in different ways. Also, while a first data stream and a second data stream are described by way of example, the present method may involve receiving a plurality of data streams, such as a third data stream and a fourth data stream.

For instance, processor 212 of device 200 in FIG. 2 may receive the first data stream and the second data stream. In some examples, processor 212 may receive the first data stream and the second data stream from another computing device via interface 202 and communication link 216, for example. In other examples, processor 212 may receive the first data stream and the second data stream from data storage 210 via communication link 216. Computing device 200 may temporarily store (i.e. buffer) the first data stream and the second data stream in data storage 210 when the first data stream and the second data stream are received via interface 202. Alternatively, computing device 200 may store the first data stream and the second data stream as video files in data storage 210. Other examples are possible as well.

A video may include a sequence of images (also known as frames). As noted above, the first data stream may represent encoded frames of a first video and the second data stream may represent encoded frames of a second video. For instance, any suitable computing device may have encoded one or more frames of the first video into the first data stream using a video codec. Further, any suitable computing device may have encoded one or more frames of the second video into the second data stream. Any suitable video codec may be used to encode the frames, including without limitation, MPEG-developed codecs (e.g. H.264/MPEG-4 AVC and H.265/MPEG-H HEVC), Windows Media Video (WMV), On2 codecs (e.g. VP8 and VP9), Sorenson, Dirac, Cinepak, or RealVideo. Although the processor may receive first video and second videos as encoded data streams, encoding the first video and/or the second video are not necessary aspects of the invention.

Depending on the video codec used to encode the first video, the first data stream and the second data stream may be arranged into different formats. As noted above, in some circumstances, the videos may be encoded using the H.264/MPEG-4 AVC (H.264) codec into a H.264 bitstream. A properly-encoded H.264 bitstream contains sufficient information to decode the encoded frames using a decoder. H.264 encoded frames of a video are typically referred to as pictures; however, for simplicity, this description will use the term "frame" to refer generically to H.264 pictures and frames of a video. The H.264 bitstream is divided into packets known as Network Abstraction Layer (NAL)-packets. Other codecs may also format data streams into packets, or may use alternate data formats.

Figure 4A:
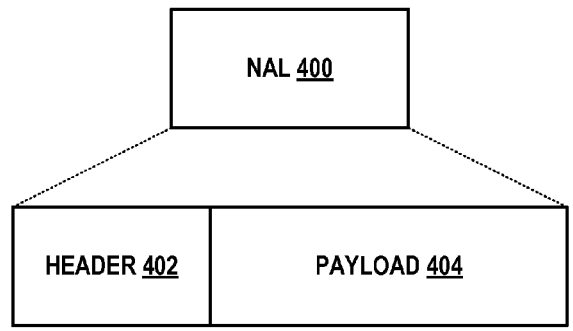
FIG. 4A illustrates example components of an example video data stream.

FIG. 4A illustrates an example NAL packet 400. As shown, the NAL packet 400 is divided into a header 402 and a payload 406. The header 402 may indicate the type of the packet. Types of NAL packets may include frame data (e.g. slice data) or header data (e.g. a parameter set), among others. Based on the type of the packet, the payload may then contain different types of data.

Figure 4B:
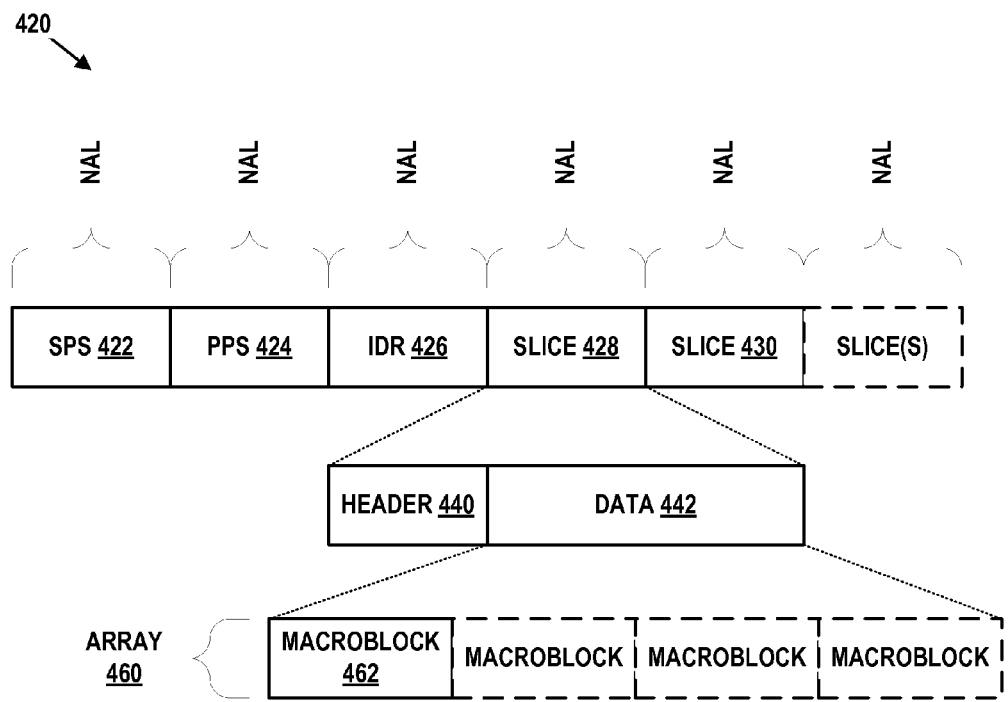
FIG. 4B illustrates example sub-components or sub-portions of the example video data stream.

FIG. 4B then illustrates an example H.264 bitstream 420 that includes a sequence of NAL-packets of different types. Bitstream 420 includes two representative slice data packets 428 and 430, and may include additional slice data packets, as shown. Frames of a H.264 bitstream are divided into one or more slices, which represent the content of the frame. Although H.264 bitstreams may divide frames into two or more slices, H.264 bitstreams may also represent all of the content of each frame as one respective slice.

Bitstream 420 includes two types of headers: a Sequence Parameter Set (SPS) 422 and a Picture Parameter Set (PPS) 424. The Sequence Parameter Set 422 contains information referring to a sequence of NAL packets (e.g. a sequence of slice packets representing frames of a video). The SPS 422 may indicate various information about a sequence, such as the height and width of frames represented by the sequence. The Picture Parameter Set (PPS) 424 contains information referring to one or more frames.

Bitstream 420 also includes instantaneous decoding refresh (IDR) packet 426. A IDR packet contains the information necessary to decode one frame. Some H.264 bitstreams use predictive encoding, which involves referencing information in other packets to encode or decode frames. A decoder may decode one or more subsequent frames in the bitstream by reference to the IDR packet. IDR packets may also be referred to as key-frames or I-frames.

Referring back to the representative slice data packets 428 and 430, each slice data packet, like other NAL packets, may include a slice header and data. Slice data packet 428 is shown by way of example as including a slice header 440 and data 442. Data 442 is further divided into a macroblock array 460. The macroblock array 460 includes at least one macroblock 462, but may include a plurality of macroblocks, as shown. The H.264 format divides slices into processing units known as macroblocks. Many video codecs use some type of processing unit. The term macroblock is used in this description to refer to H.264 macroblocks, as well as macroblocks in other MPEG codecs, coding tree units in the H.265 codec, megablocks in the VP8/9 codecs, and any other similar or equivalent part of a frame in any codec.

In the H.264 codec, the slice header contains information about the slice. For instance, the slice header may indicate the address of the first macroblock in the slice, among other parameters. Under H.264, macroblocks in a frame are addressed in raster scan order (i.e. left-to-right, top-to-bottom). Other codecs may address component parts of frames in different ways, all of which are contemplated herein. The slice header may also indicate which slice of a frame that the packet belongs to, such as the first slice or the second slice.

Figures 5A, 5B, 5C:
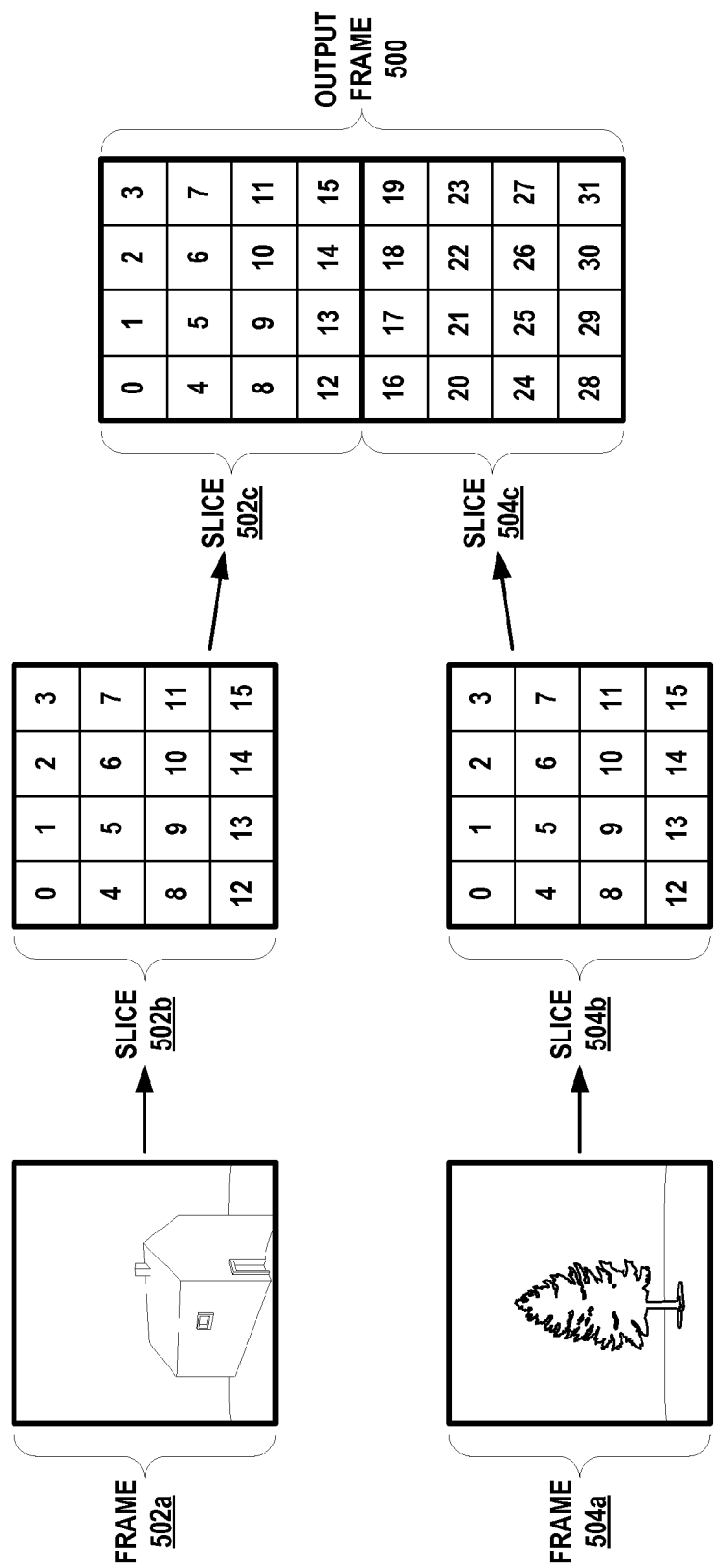
FIG. 5A illustrates example frames of video data streams.
FIG. 5B illustrates example slices of the video data streams.
FIG. 5C illustrates an example frame of a combined video data stream.

FIG. 5A illustrates example frames 502a and 504a, which are example frames of the first video and the second video, respectively. All of the content of frames 502a and 504a are represented as one slice. FIG. 5B illustrates example slices 502b and 504, which represent example frames 502a and 504a, respectively. Example slices 502b and 504b are each divided into 16 macroblocks that are addressed from 0-15 in raster scan order.

While FIG. 5B shows the macroblocks of slices 502a and 504b in raster scan order, in the bitstream, the macroblocks of each slice may be sequential elements of a macroblock array, as exemplified by array 460 of FIG. 4B. By referencing data in the header, such as the height and width of the slice and the address of the first macroblock in the slice, a decoder can arrange a sequence of macroblocks into a frame. For instance, slice 502b has a height of 4 macro blocks, a width of 4 macroblocks, and the first macroblock in the slice is at address 0. Therefore, under raster scan ordering (left-to-right, top-to-bottom), the first macroblock of slice 502b is at address 0 in the top-left corner of the frame, as shown in FIG. 5B. Since the width of the slice is 4 macroblocks, the first row includes the first four macroblocks of the frame, addressed at macroblock 1, 2, and 3, respectively, as shown. The second row includes the next four macroblocks, the third row includes the next four macroblocks after those, and the fourth row includes the last four macroblocks, also as shown. As noted above, the height of the slice is 4 macroblocks, and, accordingly, there are four rows of macroblocks in the array.

While a H.264 bitstream is described by way of example, this disclosure contemplates the different formats used by other codecs. Terms used throughout the description in describing components of H.264 are intended to refer to the H.264 component as well as any equivalent structures in other codecs. For instance, "header" refers to H.264 headers such as the Sequence Parameter Set, the Picture Parameter Set, and each slice header. And, "header" also refers generically to any portion of a data stream that contains information about the data stream. "Frame" refers to H.264 pictures or frames, and also refers generically to corresponding structures in any other codec. "Macroblock" refers specifically to H.264 and generically to sub-components of a frame as used by other codecs. Other terms used within the specification are intended to refer generally to other codecs, as well.

At block 304, the method 300 involves combining the received first data stream and the received second data stream into an output data stream. The output data stream may represent encoded frames of the first video and encoded frames of the second video such that a decoder may decode the output data stream into an output format that represents both the first video and the second video.

The output data stream may be configured to represent encoded output frames. The processor may combine a frame from the first data stream and a frame from the second data stream into an encoded output frame. FIG. 5C illustrates an example output frame 500 that includes a first slice 502c and a second slice 504c. The processor may combine a frame from the first data stream (e.g. frame 502a which is represented by slice 502b) and a frame from the second data stream (e.g. frame 504a which is represented by slice 504b) into encoded output frame 500.

The processor may combine frames from the received data streams into different arrangements. In some embodiments, the processor may arrange the frames from the received data streams into a vertical stack. For example, slice 502c of FIG. 5C is vertically stacked onto slice 504c.

In other embodiments, the processor may arrange the frames from the received data streams into a grid.

Figure 6:
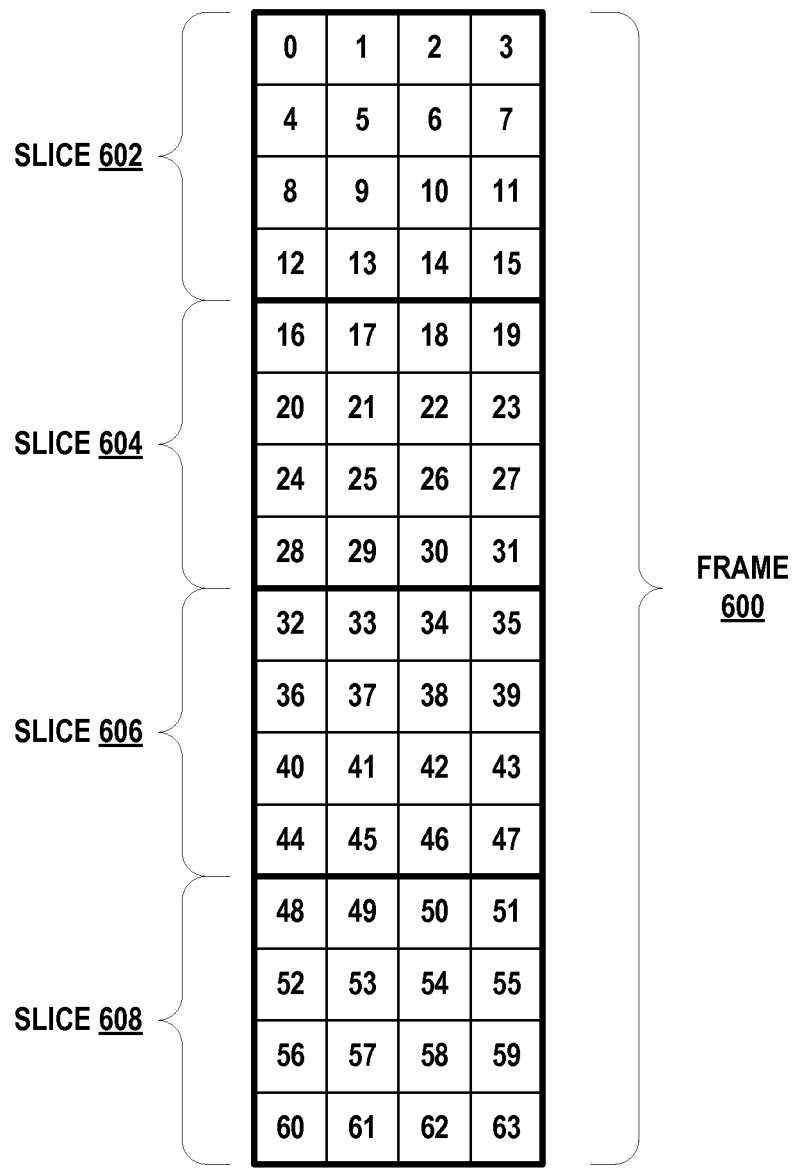
FIG. 6 illustrates example sequenced data streams and a combined stream representing the example sequenced data streams.

For decoding by particular decoders, the processor may configure the frames of the received data streams into different arrangements. For instance, some decoders may support decoding frames that are no wider than a maximum frame width. Further, the maximum frame width supported by some decoders may be relatively narrow, such that some horizontal arrangements of frames may exceed the maximum frame width. To arrange frames from the received data streams for such decoders, the frames may be vertically stacked upon one another, creating a relatively tall and narrow frame. FIG. 6 illustrates an example frame 600 that includes slices 602, 604, 606, and 608 in a vertically stacked configuration. Further, some decoders may support decoding frames up to relatively narrow maximum frame height, which may be exceeded when a certain number of frames are vertically stacked. In such a circumstance, the processor may arrange the frames into a grid. FIG. 7 illustrates an example frame 700 in which slices 702, 704, 706, and 708 are arranged into a rectangular grid.

The processor may combine frames from the first data stream and the second data stream on a frame-by-frame basis. As noted above, the first video and the second video may be represented by first frames in sequence and by second frames in sequence, respectively. Each sequence of frames may include a first frame, a second frame, a third frame, and so on. The processor may combine the first frame of the first data stream and the first frame of the second data stream into the first output frame of the output data stream. The processor may also combine the second frame of the first data stream and the second frame of the second data stream into the second output frame of the output data stream. The processor may repeat this process until it reaches the last frame of either data stream.

Figure 8:
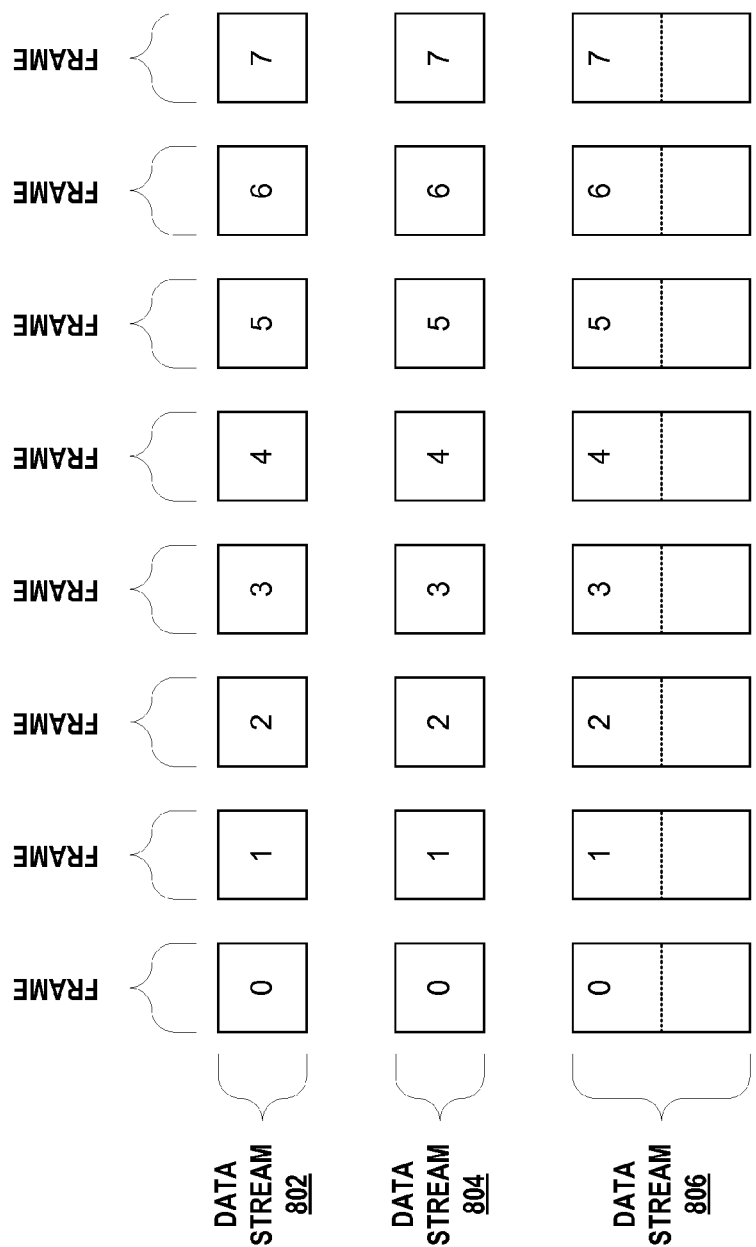
FIG. 8 illustrates an example frame of yet another combined video data stream.

FIG. 8 illustrates an example data stream 802 (i.e. a first data stream) and an example data stream 804 (i.e. a second data stream). Data stream 802 represents a sequence of eight frames of a first video. Each frame of the sequence is marked with its position in the sequence from 0 to 7, as shown. Similarly, data stream 804 represents a sequence of eight frames of a second video and each frame of the sequence is marked with its position in the sequence from 0 to 7, as shown. Data stream 806 (i.e. an output data stream) represents the combination of data stream 802 and data stream 804. Like data stream 802 and 804, data stream 806 represents a sequence of eight frames of a video and each frame of the sequence is marked with its position in the sequence from 0 to 7. A processor has combined data streams 802 and 804 into data stream 806. The frame of data stream 806 at position 0 represents the frame of data stream 802 at position 0 and the frame of data stream 804 at position 0. Similarly, the frame of data stream 806 at position 1 represents the frame of data stream 802 at position 1 and the frame of data stream 804 at position 1. And, the frames of data stream 806 at positions 2-7 represent the frames of data stream 802 at position 2-7 and the frames of data stream 804 at position 2-7, respectively.

The processor may combine the first data stream and the second data stream into the output data stream using a variety of techniques. For example, the processor may decode the data streams, combine the video into an output video, and then encode the output video into the output data stream. Alternatively, the processor may combine the first data stream and the second data stream into the output data stream without fully decoding the first data stream and the second data stream. For instance, the processor may generate the output stream and arrange the encoded frames within the output stream. Alternatively, the processor may modify the first data stream to include the second data stream. Other examples are possible as well.

As noted above, in some embodiments, a decoder may decode the first data stream and the second data stream before the processor combines frames of the first data stream with frames of the second data stream. For example, an application executing on a mobile computing device, such as a smartphone or tablet computer, may request the first video and the second video from a server that is accessible over a network, such as the Internet. The server may then send the first video and the second video, as a first data stream and a second data stream, respectively, to an intermediate computing device (e.g. a server) having one or more video encoder/decoders and at least one processor. The one or more one or more video encoder/decoders may decode the first data stream and the second data stream into the first and second video. The processor of the intermediate computing device may then combine the frames of the first video with frames of the second video into an output video. The one or more one or more video encoder/decoders may then encode the output video into the output data stream. The intermediate computing device may then send the output data stream to the mobile computing device, which may decode the output data stream using its decoder.

In some embodiments, combining the received data streams into an output data stream may involve defining in one or more headers of each received data stream that the frames represented by the received data stream are component parts of the output data stream. For instance, referring back to FIGS. 5A-C, frame 502a of the first video may be represented by slice 502b of the first data stream. Within the first data stream, slice 502b may be a particular NAL packet of the slice data type. The slice data packet may have a header containing one or more parameters that indicate to a decoder that slice 502b (and in turn, frame 502a) is part of the first data stream. Slice 504b may also have its own header indicating that slice 504b (and thus frame 504a) is part of the second data stream. When a decoder decodes a slice data packet, the decoder may reference the one or more parameters in determining which data stream the slice data packet is in. NAL packets of the same data stream may each have the same indication within their respective header, which may group the packets into the same video when decoded.

The processor may use such parameters to combine the first data stream and the second data stream into the output data stream. For each frame of the received first data stream, the processor may decode (or parse) from a header of the first data stream, one or more parameters that indicate that the frame is a slice of the first data stream. Then, the processor may define (or re-define) the one or more parameters to indicate that the frame is a first slice of a respective output frame. And, for each frame of the received second data stream, the processor may decode one or more parameters, from a header of the second data stream, that indicate that the frame is a second slice of the respective output frame. For instance, the processor may define in a header of slice 502b that slice 502b is slice 502c of frame 500 and also define in a header of slice 504b that slice 504b is slice 504c of frame 500. Then, for example, when frame 500 is decoded, the decoder will arrange the content of frame 502a as slice 502c of frame 500 of the output data stream, rather than as slice 502b of the first data stream. And the decoder will arranged the content of frame 504a as slice 504c of frame 500 of the output data stream.

The specific parameters in the header used to indicate that the frame is a slice of an output frame may vary based on the codec used to encode the received data streams. In some cases, one or more parameters may explicitly define the frame as a slice of an output frame. In other cases, the one or more parameters may implicitly define the frame as a slice of an output frame. For instance, changing an address in a header may define the frame as a slice of an output frame.

To generate the output data stream, the processor may create a header defining the output data stream. For instance, with H.264, the processor may create a SPS packet. The header of the output data stream may indicate that the output frames are part of the output data stream. The processor may also define various parameters of the output data stream in the header, such as the output frame height and the output frame width. Some of the parameters may be based on aspects of the first data stream and/or the second data stream. For instance, the processor may decode (or parse) from the first data stream and the second data stream, a first frame height and a second frame height, which may indicate the height of frames of the first data stream and the second data stream, respectively. Then, when vertically stacking frames, the processor may define in the header the height of the output frames as the sum of the first frame height and the second frame height. For instance, when combining slice 502b and 504b into frame 500, the processor may define the frame height of the output data stream as 8 macroblocks and the frame width as 4 macroblocks, as the two slices are each 4 macroblocks high and 4 macroblocks wide.

Alternatively, to generate the output data stream, the processor may define the first data stream as the output stream and then concatenate frames from the other received data streams to the first data stream. The processor may also decode parameters from one or more headers of the first data stream and re-define the one or more parameters as necessary. For instance, the processor may parse out the frame height of the first data stream and re-define the frame height as the sum of the frame heights of the frames of the first data stream and the heights of the frames of each additional data stream that is combined with the first data stream.

To arrange a frame of the first data stream and a frame of the second data stream within the output frame, the processor may define (or re-define) various parameters contained within one or more headers of the received data streams or in a header of the output data stream. As noted above, slice headers may contain an indication of the address of the first macroblock in the slice. For instance, when combining slice 502b and 504b into frame 500 (i.e. a vertically stacked configuration), the processor may define the address of the first macroblock of slice 504c as address 16. Address 16 is incremented, by a macroblock, from the address of the last macroblock of the first slice (i.e. address 15, indicating the sixteenth macroblock of slice 502c). As another example, referring to FIG. 6, to arrange slices 602, 604, 606, and 608 into a vertically stacked configuration as shown, the processor may define the address of the first macroblock of the first slice (slice 602) as 0. The processor may also define addresses of the first macroblock of slices 604, 606, and 608 as 16, 32, and 48, respectively. Each of these addresses is incremented by one macroblock from the address of the last macroblock of the preceding slice. By defining the position of the first macroblock in the slice for slices 604, 606, and 608 in this way, the processor may vertically concatenate each macroblock array of each slice to the preceding array.

The processor may also use such techniques in combining a respective frame of each received data stream into an output frame having a grid layout. Consider, for example, that the processor receives a first data stream, a second data stream, a third data stream, and a fourth data stream. Each received data stream represents frames of a respective video. Frames of each video are represented in the data stream as one four by four slice that is divided into an array of sixteen macroblocks. By way of example, slices 702, 704, 706, and 708 of FIG. 7 may represent such slices. To arrange slices 702, 704, 706, and 708 into the rectangular grid arrangement of FIG. 7, the processor may define the addresses of the first macroblock of slices 702, 704, 706, and 708 as address 0, address 4, address 32, and address 36. In this manner, the array of macroblocks in slice 704 is horizontally-concatenated to the array of macroblocks in slice 702. And, the array of macroblocks in slice 706 is vertically concatenated to the array of macroblocks in slice 702, and the array of macroblocks in slice 708 is horizontally concatenated to the array of macroblocks in slice 706.

As noted above, some decoders may have maximum frame height and/or maximum frame width limitations. In some cases, the processor may use a grid layout to avoid these limitations. For instance, the processor may arrange two frames into a vertically stacked configuration if the sum of the respective frame heights of each of the two frames is less than or equal to a maximum frame height of a particular decoder. And, if the sum of the respective frame heights of each of the two frames is greater than a maximum frame height of a particular decoder, the processor may arrange the two frames horizontally. Such a configuration may indicate a preference for a vertically stacked configuration of frames. Some embodiments may prefer a different configuration of frames.

Some codecs require sequencing of the component parts of a frame (e.g. slices and macroblocks) in decoding order (e.g. raster scan order). However, some combinations of frames of received data streams into output frames may result in the array of macroblocks of each slice reaching the decoder out of decoding order. The processor and the decoder may then decode the slices out of order. For instance, H.264 includes a feature called arbitrary slice ordering that allows the decoder to receive slices of an output frame in any order. For each slice, the processor may decode one or more parameters indicating the slice length of the slice (i.e. the number of elements in the macroblock array) and the macroblock address of the first macroblock in the slice. The processor may then use the one or more decoded parameters to send each slice individually to the decoder. The decoder may then decode the frame after it has received all of the slices of the frame, or the decoder may decode the slices in the order in which they come to the decoder.

Some decoders may require that the encoded frames of the output data stream have a consistent frame width. Within examples, the processor may decode from a header of the first data stream a first frame width that indicates the width of the encoded frames of the first data stream. The processor may also decode from a header of the second data stream a second frame width that indicates the width of the encoded frames of the second data stream. The processor may then determine that the first frame width is equivalent to the second frame width. Then, at some point, such as during generation of the output data stream, the processor may define in a header of the output data stream that the encoded output frames have a width that is equal to the encoded frames.

Figure 9:
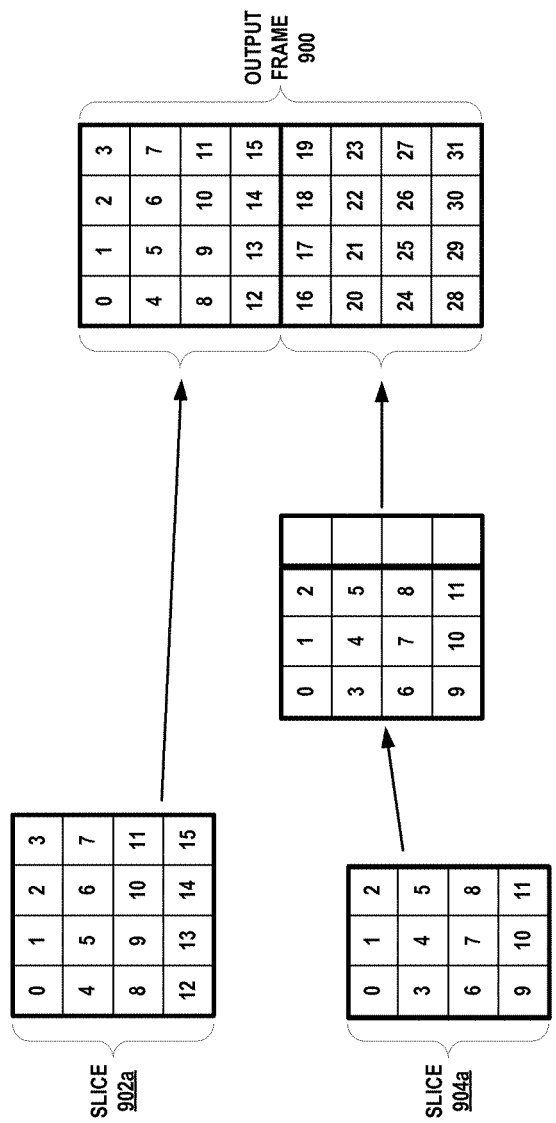
FIG. 9 illustrates example slices and an example output frame that combines the example slices.

However, in some cases, the encoded frames of the first data stream and the encoded frames of the second data stream may have different frame widths. In some examples, the method may then further involve padding the frames of one of the received data streams to make the frames widths equal. For instance, referring to FIG. 9, slices 902a and 904a may represent a frame of a first data stream and a frame of a second data stream, respectively. Slice 902a and 904a have frame widths of 4 macroblocks and 3 macroblocks, respectively. The processor may determine that the frame width of slice 904a is less than the frame width of slice 902a. The processor may then pad the slice 904a with additional macroblock data such that the width of slice 904a is equal to the width of slice 902b. The processor may then combine slice 902a and slice 904a into output frame 900. After output frame 900 is decoded, the processor may provide for display the frame of the second data stream without the additional macroblock data.

Figure 10:
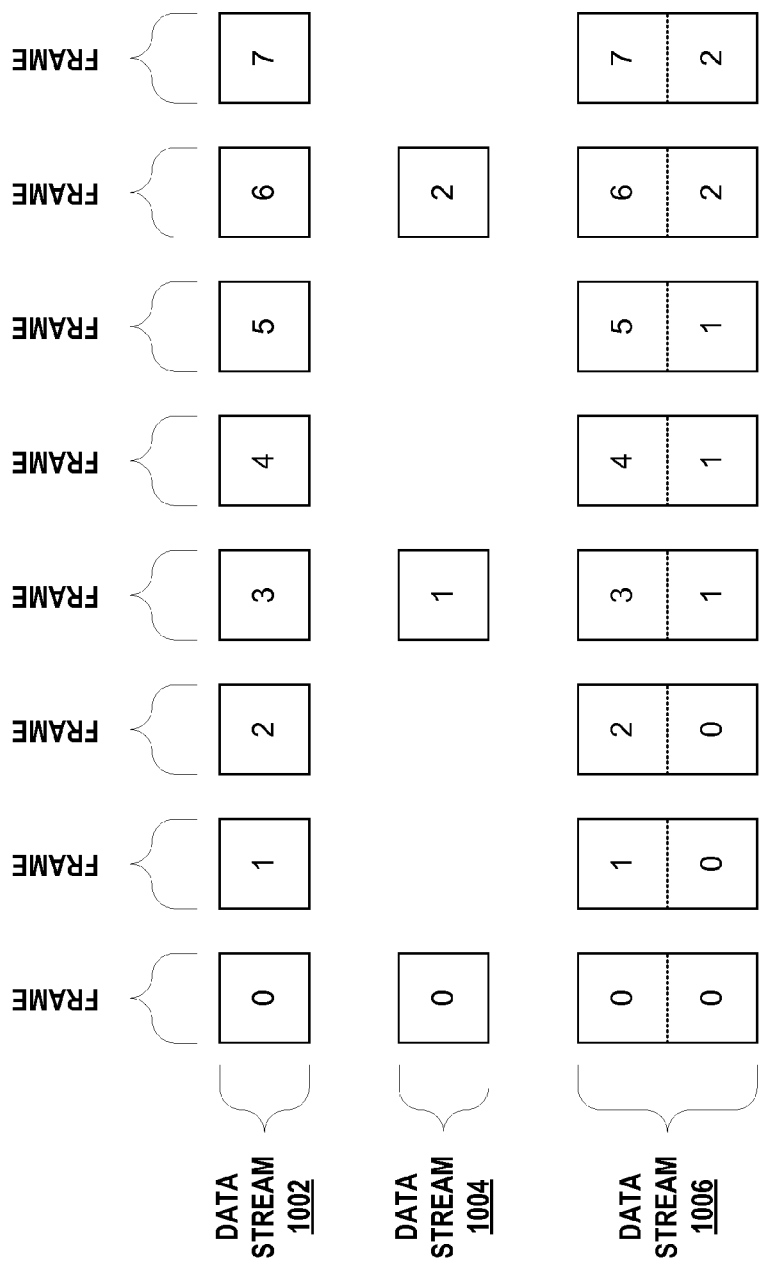
FIG. 10 represents example ordered data streams having different frame rates and a combined stream representing the example ordered data streams.

In some cases, the first video (represented by the first data stream) and the second video (represented by the second data stream) may have different frame rates. For example, referring to FIG. 10, data stream 1002 may represent a first video having a first frame rate that is three times the second frame rate of a second video that is represented by data stream 1004. Within examples, the processor may insert frames into the second data stream so that the frame rates of the data streams are equivalent. For instance, the processor may insert two frames into data stream 1004 after every frame of the second data stream. Then data stream 1002 and data stream 1004 are combined into data stream 1006 with the same frame rate. So that the content of the second video is not altered, the content of each inserted frame may represent content of a frame that neighbors the inserted frame with the second data stream. For instance, a type of frame known as a P-frame which consists of P_SKIP macroblocks may be inserted into the frames such that the content of the inserted frame represents the content of the preceding frame. P-frames use data from previous frames to decode the content in the P-frame.

Further, some codecs may require the key-frame intervals of received data streams to be equivalent in order to decode the output data stream when the received data streams are combined. Key-frames (also known as I-frames) do not require other video frames to decode. The processor may insert frames to make the key-frame intervals of the received data streams equivalent. For instance, when the second video has a lower frame rate than the first video, the processor may insert, after each key-frame in the second data stream, a particular number of frames. In some examples, the inserted frames may be P-frames which consist of P_SKIP macroblocks. As noted above, the particular number of frames may be proportional to the difference in the frames rates of the received data streams.

Other codecs may permit different key-frame intervals. With such codecs, the processor may combine different types of frame types for decoding by a decoder compatible with the codec. For instance, the processor may combine a I-frame from the first data stream with a P-frame from the second data stream.

At block 306, the method involves decoding the output data stream into an output surface format that includes, in respective non-overlapping regions, decoded frames of the first video and decoded frames of the second video. For instance, processor 212 of FIG. 2 may decode the output data stream using a decoder 222 that is a component of processor 212. Alternatively, processor 212 may provide output data stream to a different processor, such as GPU 214, which may decode the output data stream using decoder 224. As another example, processor 212 may send the output data stream to a decoder on another computing device, such as a mobile computing device, via interface 202.

The output surface format may, for example, represent each frame of the output data stream as an array of pixel data. Each array of pixel data may represent a frame of the first video and a frame of the second video in a different region. The processor may then sample from the different regions to divide the output surface format into the first video and the second video.

At block 308, the method involves providing the decoded frames of the first video and the decoded frames of the second video display. For instance, processor 212 may provide the decoded frames to interface 202. As noted above, interface 202 may include a screen, such as a touchscreen, which may display the decoded frames of each video when they are provided to interface 202 by the processor.

In some examples, the processor 212 may provide the first video and the second video for display at different times. For instance, at a first presentation time, the processor 212 may sample the first video from the output surface format and provide the first video for display. At a second presentation time, the processor 212 may sample the second video from the output surface format and provide the second video for display.

In other examples, processor 212 may provide the first video and the second video for concurrent display. Concurrent display of the first video and the second video may involve positioning the decoded frames of each video in respective arbitrarily-located positions on a display. Concurrent display of the first video and the second video may have various applications. As one example, the first video (represented in the first data stream) and the second video (represented in the second data stream) may represent a video call from a first device and a video call from a second device respectively. By combining the video calls from the two devices and decoding the video calls as a combined output data stream, both video calls may be hardware-decoded simultaneously, which may enable assorted features of a video chat application. For example, the video chat application may support a greater number of concurrent users in a single group chat or display video calls during a group chat at higher frame rates.

In some examples, the first video and the second video may represent video previews of respective videos. For instance, a news feed application may provide for display of a video preview next to each news item. By application of the present method, the processor may combine the video previews into an output data stream and then decode them together by decoding the output data stream. This may enable various features of the news feed application. For instance, two or more of the video previews may play concurrently. Alternatively, a video gallery application may indicate each video in the gallery using a video preview. Other applications are possible as well.

Within examples, the processor may divide received data streams into sets. The processor may then combine the data streams in the set into an output data stream. The processor may select particular data streams for each group based on characteristics of the data stream. For instance, as noted above, some decoders may require that the key-frame intervals of the combined data streams are equivalent. From received data streams, the processor may parse one or more parameters that indicate the key-frame interval of the data stream. Then the processor may select, as a set, particular data streams having the same key-frame interval. Similarly, the processor may select particular data streams having frames of the same frame width as a set. Selection based on other parameters, such as frame rate, is possible as well.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving a first data stream that represent a first video, wherein the first data stream includes a first sequence of frames that includes first intra-coded frames;
    receiving a second data stream that represent a second video, wherein the second data stream includes a second sequence of frames that includes second intra-coded frames, wherein the first video has a first frame rate that is higher than a second frame rate of the second video;
    after second intra-coded frames of the second data stream, inserting a particular number of frames into the second data stream, wherein the particular number of frames is proportional to a difference between the first frame rate and the second frame rate;
    combining the received first data stream and the received second data stream to obtain an output data stream of encoded output frames such that an encoded output frame includes a respective frame of the first sequence and a respective frame of the second sequence and that first intra-coded frames are combined with respective second intra-coded frames in respective encoded output frames within the output stream; and
    sending the output data stream to a decoder for decoding the output data stream into the first video and the second video.

2. The method of claim 1, wherein combining the received first data stream and the received second data stream into an output data stream of encoded output frames further comprises:
    combining first inter-coded frames of the first data stream with respective second inter-coded frames of the second data stream.

3. The method of claim 1, wherein the first encoded frames are divided into a respective first coding unit arrays, and wherein the second encoded frames are divided into respective second coding unit arrays, and wherein combining the received first data stream and the received second data stream comprises combining a given first coding unit array with a given second coding unit array to obtain an encoded output frame.

4. The method of claim 1, further comprising:
    decoding, by a decoder, the output data stream of encoded output frames into an output surface format that includes decoded frames of the first video and decoded frames of the second video.

5. The method of claim 1, wherein each of the first data stream and the second data stream represents one of: a video preview, a video advertisement, or a video call.

6. A non-transitory computer readable medium having stored therein instructions, that when executed by a processor, cause the processor to perform operations, the operations comprising:
    receiving a first data stream that represent a first video, wherein the first data stream includes a first sequence of frames that includes first intra-coded frames;
    receiving a second data stream that represent a second video, wherein the second data stream includes a second sequence of frames that includes second intra-coded frames, wherein the first video has a first frame rate that is higher than a second frame rate of the second video;
    after second intra-coded frames of the second data stream, inserting a particular number of frames into the second data stream, wherein the particular number of frames is proportional to a difference between the first frame rate and the second frame rate;
    combining the received first data stream and the received second data stream to obtain an output data stream of encoded output frames such that an encoded output frame includes a respective frame of the first sequence and a respective frame of the second sequence and that first intra-coded frames are combined with respective second intra-coded frames in respective encoded output frames within the output stream; and
    sending the output data stream to a decoder for decoding the output data stream into the first video and the second video.

7. The computer readable medium of claim 6, wherein combining the received first data stream and the received second data stream into an output data stream of encoded output frames further comprises:
    combining first inter-coded frames of the first data stream with respective second inter-coded frames of the second data stream.

8. The computer readable medium of claim 6, wherein the first encoded frames are divided into a respective first coding unit arrays, and wherein the second encoded frames are divided into respective second coding unit arrays, and wherein combining the received first data stream and the received second data stream comprises combining a given first coding unit array with a given second coding unit array to obtain an encoded output frame.

9. The computer readable medium of claim 6, wherein the operations further comprise:
    decoding, by a decoder, the output data stream of encoded output frames into an output surface format that includes decoded frames of the first video and decoded frames of the second video.

10. The computer readable medium of claim 6, wherein each of the first data stream and the second data stream represents one of: a video preview, a video advertisement, or a video call.

11. A device comprising:
    one or more processors; and
    data storage configured to store instructions, that when executed by the one or more processors, cause the device to:
        receive a first data stream that includes a sequence of first encoded frames, wherein each first encoded frame is divided into a respective first coding unit array;
        receive a second data stream that includes a sequence of second encoded frames, wherein each second encoded frame is divided into a respective second coding unit array, wherein the first data stream represents a first video having a first frame rate, and wherein the second data stream represents a second video having a second frame rate that is lower than the first frame rate;

after second intra-coded frames of the second data stream, insert a particular number of frames into the second data stream, wherein the particular number of frames is proportional to a difference between the first frame rate and the second frame rate;

combine the received first data stream and the received second data stream into an output data stream of encoded output frames such that an encoded output frame includes a first coding unit array and a second coding unit array, wherein intra-coded coding unit arrays of the first sequence are combined with respective intra-coded coding unit arrays of the second sequence; and send the output data stream to a decoder for decoding the output data stream into the first video and the second video.

12. The device of claim 11, wherein combining the received first data stream and the received second data stream into an output data stream of encoded output frames further comprises:

combining first inter-coded frames of the first data stream with respective second inter-coded frames of the second data stream.

13. The device of claim 11, wherein the instructions further cause the device to:

decoding, by a decoder, the output data stream of encoded output frames into an output surface format that includes decoded frames of the first video and decoded frames of the second video.

14. The device of claim 11, wherein combining the received first data stream and the received second data stream comprises concatenating a given first coding unit array with a given second coding unit array to obtain an encoded output frame.

15. The method of claim 1, further comprising:

determining that the frames of the first sequence of frames have a first frame width and that the frames of the second sequence of frames have a second frame width that is less than the first frame width; and padding the frames of the second sequence of frames with additional frame data such that the frames of the first sequence of frames and the frames of the second sequence of frames have the same frame width.

16. The computer readable medium of claim 6, wherein the operations further comprise:

determining that the frames of the first sequence of frames have a first frame width and that the frames of the second sequence of frames have a second frame width that is less than the first frame width; and padding the frames of the second sequence of frames with additional frame data to obtain padded frames having the first frame width.

17. The device of claim 11, wherein the instructions further cause the device to:

determine that the frames of the first sequence of frames have a first frame width and that the frames of the second sequence of frames have a second frame width that is less than the first frame width; and pad the frames of the second sequence of frames with additional coding unit data to obtain padded frames having the first frame width.

* * * * *